United States Patent
DeMent et al.

(10) Patent No.: US 7,516,275 B2
(45) Date of Patent: Apr. 7, 2009

(54) PSEUDO-LRU VIRTUAL COUNTER FOR A LOCKING CACHE

(75) Inventors: Jonathan James DeMent, Austin, TX (US); Ronald P. Hall, Cedar Park, TX (US); Brian Patrick Hanley, Austin, TX (US); Kevin C. Stelzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 11/380,140

(22) Filed: Apr. 25, 2006

(65) Prior Publication Data

US 2007/0250667 A1 Oct. 25, 2007

(51) Int. Cl.
*G06F 12/00* (2006.01)
*G06F 13/00* (2006.01)
*G06F 13/28* (2006.01)

(52) U.S. Cl. .................. 711/128; 711/133; 711/136
(58) Field of Classification Search .................. None
See application file for complete search history.

(56) References Cited

U.S. PATENT DOCUMENTS

| | | | | |
|---|---|---|---|---|
| 5,594,886 A | * | 1/1997 | Smith et al. ................. | 711/136 |
| 7,055,004 B2 | * | 5/2006 | DeMent et al. ............. | 711/136 |
| 2003/0159003 A1 | * | 8/2003 | Gaskins et al. .............. | 711/128 |
| 2004/0143708 A1 | * | 7/2004 | Caprioli ...................... | 711/136 |
| 2005/0055506 A1 | * | 3/2005 | DeMent et al. ............. | 711/133 |
| 2007/0043906 A1 | * | 2/2007 | Hall et al. ................... | 711/136 |
| 2007/0186046 A1 | * | 8/2007 | Irish et al. ................... | 711/133 |

OTHER PUBLICATIONS

U.S. Appl. No. 11/204,407, filed Aug. 16, 2005, Hall et al.

* cited by examiner

*Primary Examiner*—Matt Kim
*Assistant Examiner*—Michael Alsip
(74) *Attorney, Agent, or Firm*—Yee & Associates, P.C.; Matthew B. Talpis (57) ABSTRACT

A computer implemented method and system for managing replacement of sets in a locked cache. A cache access by a program is performed, and a side of a binary tree pointed to by a base leaf is identified. A determination is made as to whether a number of accesses to the identified side of the binary tree equals a number of sets associated with the program on the identified side. The base leaf is changed to point to an opposite side of the binary tree if the number of accesses to the identified side equals the number of sets associated with the program on the identified side.

3 Claims, 5 Drawing Sheets

500
- LRU_bit0_new = (not LRU_bit0) AND (LRU_bit1) AND (LRU_bit4)
- LRU_bit1_new = (not LRU_bit0) AND (not LRU_bit1)
- LRU_bit3_new = (not LRU_bit0) AND (not LRU_bit1) AND (not LRU_bit3)
- LRU_bit4_new = (not LRU_bit0) AND (LRU_bit1) AND (not LRU_bit4)

502
- bit0_wr_en = write_pluse
- bit1_wr_en = (not bit0) AND write_pluse
- bit3_wr_en = (not bit0) AND (not bit1) AND write_pluse
- bit4_wr_en = (not bit0) AND ( bit1 ) AND write_pluse

FIG. 6

600 {
- LRU_bit0_new = setD_hit AND (not LRU_bit0) AND (LRU_bit1) AND (LRU_bit4) OR LRU_bit0
- LRU_bit1_new = setA_hit OR setB_hit
- LRU_bit3_new = setA_hit
- LRU_bit4_new = setC_hit
}

602 {
- bit0_wr_en = write_pluse
- bit1_wr_en = (setA_hit OR setB_hit OR setC_hit OR setD_hit) AND write_pluse
- bit3_wr_en = (setA_hit OR setB_hit) AND write_pluse
- bit4_wr_en = (setC_hit OR setD_hit) AND write_pluse
}

FIG. 7

| SET NAME | LRU BIT(0:6) |
|---|---|
| A | 00x0xxx |
| B | 00x1xxx |
| C | 01xx0xx |
| D | 01xx1xx |
| E | 1x0xx0x |
| F | 1x0xx1x |
| G | 1x1xxx0 |
| H | 1x1xxx1 |

700
702
704
706
708
710
712
714
716

-NOTE: x IS DON'T CARE

FIG. 8

| SET TO REPLACE | UPDATED LRU BITS(0:6) |
|---|---|
| set B | 01x00xx |
| set C | 00x01xx |
| set A | 01x11xx |
| set D | 10x10xx |
| set E | 00x10xx |

| ACTION | CURRENT LRU BITS(0:6) | SET TO REPLACE | UPDATED LRU BITS(0:6) | |
|---|---|---|---|---|
| CACHE HIT @ set B | 00x10xx | set B | 01x00xx | 902 |
| CACHE MISS | 01x00xx | set C | 00x01xx | 904 |
| CACHE HIT @ set A | 00x01xx | set A | 01x11xx | 906 |
| CACHE MISS | 01x11xx | set D | 10x10xx | 908 |
| CACHE HIT @ set D | 10x10xx | set D | 10x10xx | 910 |
| CACHE HIT @ set C | 10x10xx | set C | 10x11xx | 912 |
| CACHE MISS | 10x11xx | set E | 00x11xx | 914 |
|  |  |  |  |  |

PSEUDO-LRU VIRTUAL COUNTER FOR A LOCKING CACHE

BACKGROUND

1. Field of the Invention

The present application relates generally to an improved data processing system and in particular to a method and apparatus for processing data. Still more particularly, the present invention relates to a computer implemented method, apparatus, and computer usable program code for managing data in a cache.

2. Description of the Related Art

A cache is a section of memory used to store data that is used more frequently than those in storage locations that may take longer to access. Processors typically use caches to reduce the average time required to access memory. When a processor wishes to read or write a location in main memory, the processor first checks to see whether that memory location is present in the cache. If the processor finds that the memory location is present in the cache, a cache hit has occurred. Otherwise, a cache miss is present. As a result of a cache miss, a processor immediately reads or writes the data in the cache line. A cache line is a location in the cache that has a tag containing the index of the data in main memory that is stored in the cache. This cache line is also called a cache block.

A design problem currently facing processor development is memory latency. In many processor designs, the cycle time for data delivery from main memory to an execution unit could exceed 400 cycles. To help this problem, local level one (L1) and level two (L2) caches are used. Local level caches are subsets of memory used to help temporal and spatial locality of data, two common architecture problems.

Local memory contention and false sharing problems are introduced when operating systems employ environment techniques like multitasking and multithreading. These applications could cause a cache to thrash. This non-deterministic memory reallocation will decrease the efficiency of locality of data techniques, such as prefetch and castout.

Applications can be separated into three data pattern types: streaming, locking and opportunistic. Streaming is data accessed sequentially, perhaps modified, and then never referred to again. Locking is especially associative data that may be referenced multiple times or after long periods of idle time. Allocation and replacement are usually handled by some random, round robin, or least recently used (LRU) algorithms. Software could detect the type of data pattern it is using and should use a resource management algorithm concept to help hardware minimize memory latencies. Software directed set allocation and replacement methods in a set associative cache will create "virtual" operating spaces for each application. In some cases, software can divide the 8-way set associative cache into the combination of 5 ways and 3 ways, 6 ways and 2 ways, 7 ways, and 1 way. A cache structure is divided into entries (like rows) and ways (like columns). Each entry can have multiple ways. In an 8-way set associative cache, there are 8 ways in each entry. Therefore, data can be stored in 1 out of 8 ways in an entry. A way is also referred to as a set. Opportunistic describes random data accesses.

Pseudo-LRU (p-LRU) is an approximated replacement policy to keep track of the order in which lines within a cache congruence class are accessed, so that only the least recently accessed line is replaced by new data when there is a cache miss. For each cache access, the p-LRU is updated such that the last item accessed is now most recently used and the second to least recently used, now becomes the least recently used data.

A full LRU is very expensive to implement. It requires at least $\log_2(N!)$ bits per congruence class for an N-way set associative cache (e.g., 5 bits for a 4-way). A commonly used compromise is pseudo-LRU. Traditionally, pseudo-LRU is implemented with a binary tree algorithm, which uses only $N-1$ bits, or 7 bits for an 8-way set associative cache. Each bit represents one interior node of a binary tree whose leaves represent the N sets.

The goal of pseudo-LRU replacement is to stay as close to the performance as found with a full LRU process while saving the amount of space needed. However, in a case in which the pseudo-LRU process divides the 8-way associative cache in an unbalanced manner into the combination of 5 ways and 3 ways or 6 ways in 2 ways, the pseudo-LRU process only achieves about forty percent of the performance as compared to a full LRU in a consecutive cache miss case. Additionally, the current process only achieves about forty percent of a full LRU process performance in cache accesses that combine cache misses with cache hits.

SUMMARY

The present invention provides a computer implemented method, apparatus, and computer usable program code for managing replacement of sets in a locking cache. Responsive to a cache access by a program, a side of a binary tree pointed to by a base leaf is identified. A determination is made as to whether a number of accesses to the identified side of the binary tree equals a number of sets associated with the program on the identified side. The base leaf is changed to point to an opposite side of the binary tree if the number of accesses to the identified side equals the number of sets associated with the program on the identified side.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
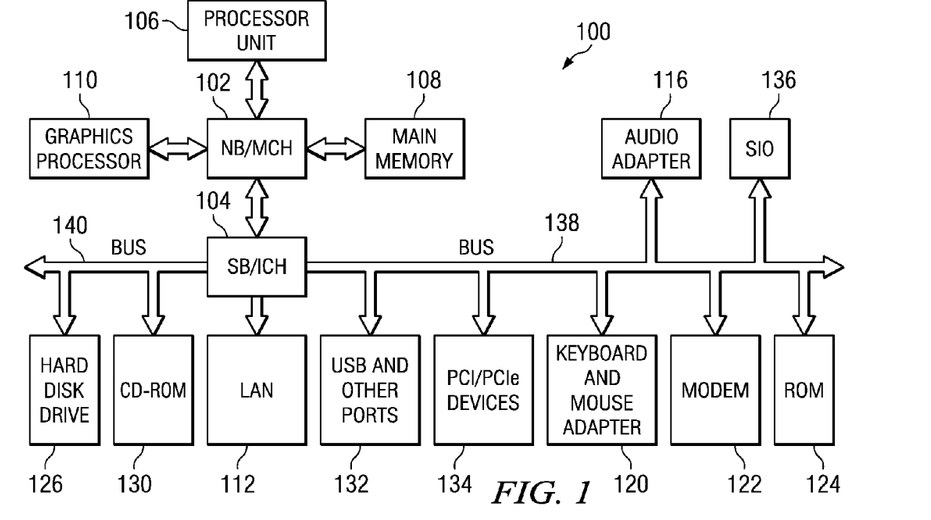
FIG. 1 is a block diagram of a data processing system in which the illustrative embodiment may be implemented.

With reference now to FIG. 1, a block diagram of a data processing system is shown in which aspects of the present invention may be implemented. Data processing system 100 is an example of a computer the processes an apparatus of the present invention may be located. In the depicted example, data processing system 100 employs a hub architecture including a north bridge and memory controller hub (MCH) 102 and a south bridge and input/output (I/O) controller hub (ICH) 104. Processor unit 106, main memory 108, and graphics processor 110 are connected to north bridge and memory controller hub 102.

Graphics processor 110 may be connected to the MCH through an accelerated graphics port (AGP), for example. Processor unit 106 contains a set of one or more processors. When more than one processor is present, these processors may be separate processors in separate packages. Alternatively, the processors may be multiple cores in a package. Further, the processors may be multiple multi-core units.

An example of this type of processor is a Cell Broadband Engine™ processor, which is a heterogeneous processor. This process has a processor architecture that is directed toward distributed processing. This structure enables implementation of a wide range of single or multiple processor and memory configurations, in order to optimally address many different systems and application requirements. This type of processor can consist of a single chip, a multi-chip module (or modules), or multiple single-chip modules on a motherboard or other second-level package, depending on the technology used and the cost/performance characteristics of the intended implementation. A Cell Broadband Engine™ has a PowerPC Processor Element (PPE) and a number of Synergistic Processor Units (SPU). The PPE is a general purpose processing unit that can perform system management functions, like addressing memory-protection tables. SPUs are less complex computation units that do not have the system management functions. Instead, the SPUs provide computational processing to applications and are managed by the PPE.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100 (Java is a trademark of Sun Microsystems, Inc. in the United States, other countries, or both).

Instructions for the operating system, the object-oriented programming system, and applications or programs are located on storage devices, such as hard disk drive 126, and may be loaded into main memory 108 for execution by processor unit 106. The processes of the present invention are performed by processor unit 106 using computer implemented instructions, which may be located in a memory such as, for example, main memory 108, read only memory 124, or in one or more peripheral devices.

Those of ordinary skill in the art will appreciate that the hardware may vary depending on the implementation. Other internal hardware or peripheral devices, such as flash memory, equivalent non-volatile memory, or optical disk drives and the like, may be used in addition to or in place of the hardware. Also, the processes of the present invention may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Figure 2:
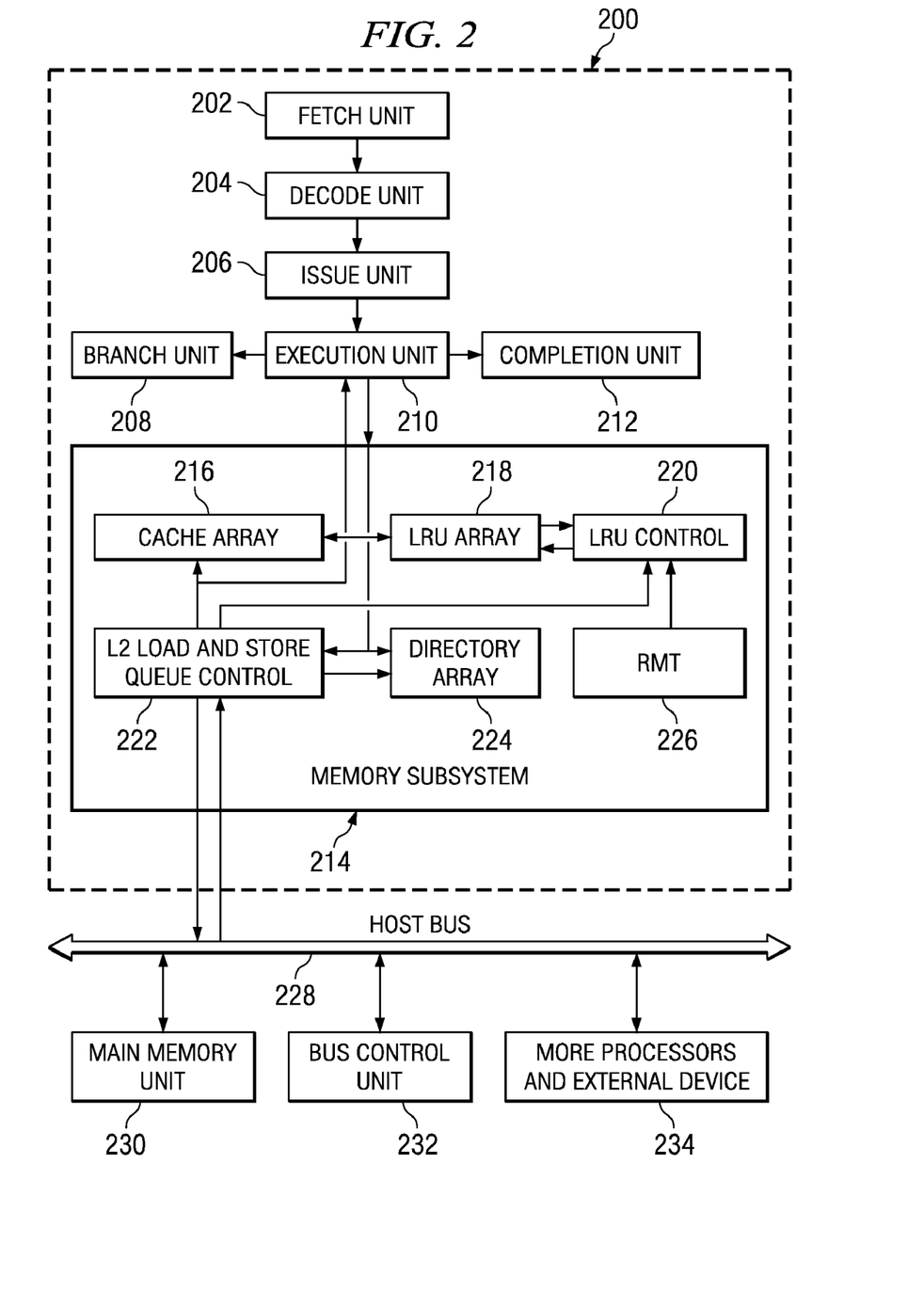
FIG. 2 is a diagram illustrating a processor system in accordance with the illustrative embodiment.

Turning now to FIG. 2, a diagram illustrating a processor system is depicted in accordance with the illustrative embodiment. Processor system 200 is an example of a processor that may be found in processor unit 106 in FIG. 1. In this example, processor system 200 contains fetch unit 202, decode unit 204, issue unit 206, branch unit 208, execution unit 210, and completion unit 212. Processor unit 200 also contains memory subsystem 214. Memory subsystem 214 contains cache array 216, least recently used (LRU) array 218, LRU control 220, L2 load and store queue control 222, directory array 224, and replacement management table (RMT) 226. Processor system 200 connects to host bus 228. Additionally, main memory unit 230, bus control unit 232, and more processors and external devices 234 also connect to host bus 228.

In these examples, fetch unit 202, fetches instructions from memory subsystem 214 or main memory 230 to speed up execution of a program. Fetch unit 202 retrieves an instruction from memory before that instruction is needed, to avoid the processor having to wait for the memory, such as memory subsystem 214 or main memory 230 to answer a request for the instruction. Decode unit 204 decodes an instruction for execution. In other words, decode unit 204 identifies the command to be performed, as well as operands on which the command is to be applied. Issue unit 206 sends the decoded instruction to a unit for execution, such as, for example, execution unit 210. Execution unit 210 is an example of a unit that executes the instruction received from issue unit 206. Execution unit 210 performs operations and calculations called for by the instruction. For example, execution unit 210 may include internal units, such as a floating point unit, an arithmetic logic unit (ALU), or some other unit. Completion unit 212 validates the operations in the program order for instructions that may be executed out of order by execution unit 210. Branch unit 208 handles branches in instructions.

Cache array 216 contains sets for data needed by processor system 200. These sets are also called ways and are also like columns in the array. In these examples, cache array 216 is an L2 cache. LRU array 218 hold bits for an N-way set associative cache. Set associative cache is a cache that has different data in a secondary memory that can map to the same cache entry. In an 8-way set associative cache, there are 8 different ways or sets per entry. Therefore, there can be 8 different data that map to the same entry. This system is used to improve the cache hit rate performance. Each bit in this array represents one interior node of a binary tree with leaves that represent the least recently used information for each way or set for the corresponding cache entry. LRU control 220 contains the process of the illustrative embodiments used to manage the data stored in cache array 216. Replacement management table (RMT) 226 defines which sets in a set associative cache are used for replacement. In an 8-way set associative cache, RMT 226 can be a table that is 8 bits wide and 8 entries deep. Each bit in an entry can store locking information for a cache way. If the value is "1", it is free to be replaced. If the value is "0", it is locked from replacement. Each entry in RMT 226 can be assigned for different programs or memory space. The RMT is programmed by privileged mode software, such as operating software. L2 load and store queue control 222 controls storage and retention of cache sets in the L2 cache, cache array 216.

Directory array 224 stores the cache coherence information, real address, and valid bit for the data in the corresponding cache entry in cache array 216. This array also has the same set-associative structure as cache array 216. For example, in an 8-way set associative cache, directory array 224 also has 8 ways. A way is also referred to as a set. This directory has a one to one match. Each time cache array 216 is accessed, directory array 224 will be accessed at the same time to determine if a cache hit or miss occurs and if the entry is valid.

Main memory unit 230 contains instructions and data that may be fetched or retrieved by processor system 200 for execution. In a case in which the data has not been fetched to cache array 216, bus control unit 232 performs as the traffic controller for the bus to arbiter requests and responses from the devices attach to the bus. In this example, execution unit 210 sends a request and an address to memory subsystem 214 when a miss occurs in a L1 data cache (not shown) in execution unit 210. As a result, execution unit 210 causes L2 load and store queue control 222 to access LRU array 218, directory array 224 and cache array 216. The data in directory array 224 can be brought in by a cache miss in the L1 cache. Directory array 224 returns the data to indicate whether the data requested in the miss in the L1 cache is located in cache array 216, which serves as an L2 cache in this example. The data returned from directory array 224 includes a hit or miss; the data in the way of the cache entry is valid or invalid; and what memory coherence state of the entry, such as share, exclusive, modify. LRU array 218 returns LRU data to LRU control 220. LRU control 220 also retrieves locking information for the sets from RMT 226. RMT 226 provides replacement management strategies for different request memory address ranges in cache array 216.

In these illustrative examples, the cache system uses a "locking" strategy to form a locking cache. A locking cache is a cache in which one or more cache sets are prevented from being replaced. Those cache sets are considered "locked". One example is a first level interrupt handler that an operating system selects to lock a given set in cache array 216. With this information, LRU control 220 computes the least recently used and most recently used cache sets that have been most updated for cache array 216.

If a request for data results in a hit in directory array 224, LRU control 220 updates the LRU data stored in LRU array 218. In this case, cache array 216 contains the data and has no other information. Directory array 224 can be viewed as the array holding all other information in the cache array, such as address, validity, and cache coherence state. When there is a L1 cache miss request with address to access the directory and cache array, if the address matches with the address that is stored in the corresponding entry in directory array 224, that means a hit is present in the L2 cache array. Otherwise, a miss occurs. This update to the LRU data is the most and least recently used set in the L2 cache, cache array 216. LRU control 220 updates the LRU data from a binary tree scheme, described herein, by writing back to LRU array 218. Cache array 216 returns data to execution unit 210 in response to the hit on directory array 224.

A miss in directory array 224 results in execution unit 210 placing the request into L2 load and store control 222. Requests remain in this component until L2 load and store queue control 222 retrieves data from host bus 228. In response to this miss, LRU control 220 updates the LRU data from the binary tree scheme by writing back to LRU array 218. This update of LRU data contains the most and least recently used cache set in cache array 216. Once miss data returns to the L2 cache from the host bus 228, LRU control 220 also forwards this data back to the L1 cache and execution unit 210.

Figure 3:
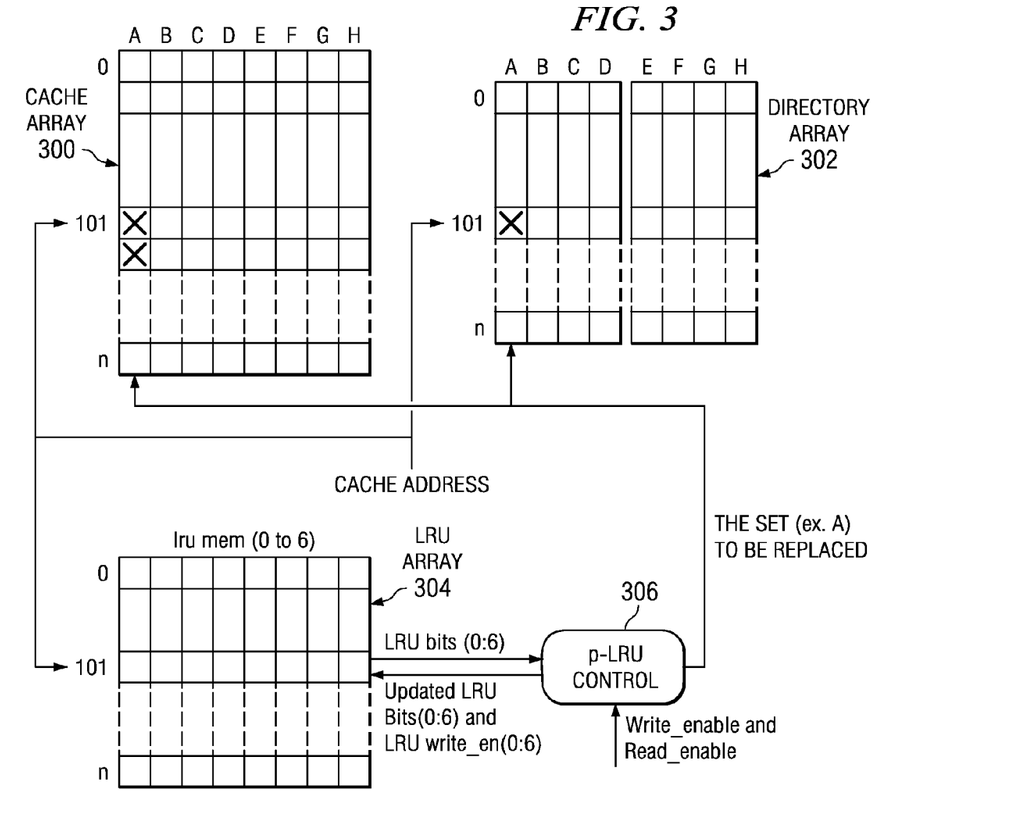
FIG. 3 is a diagram illustrating components used in managing a cache in accordance with the illustrative embodiment.

With reference now to FIG. 3, a diagram illustrating components used in managing a cache is depicted in accordance with an illustrative embodiment. In this example, these components include cache array 300, directory array 302, LRU array 304, and pseudo-LRU (p-LRU) control 306. Cache array 300 is similar to cache array 216 in FIG. 2. Directory array 302 may be implemented as directory array 224 in FIG. 2. LRU array 304 may be implemented as LRU array 218 in FIG. 2. P-LRU control 306 may be implemented as or part of LRU control 220 in FIG. 2.

This diagram illustrates how p-LRU control 306 interacts with cache array 300, directory array 302, and LRU array 304. Whenever p-LRU control 306 receives a load/store request along with an address from an execution unit or a L2 load and store queue (not shown), p-LRU 306 examines data within LRU 304. In particular, p-LRU control 306 retrieves LRU bits from LRU array 304. The same number of entries are present in the L2 cache array, directory array 302 and LRU array 304. When a L1 cache miss request is sent down to p-LRU control 306, this request also includes the address. P-LRU control 306 uses this address in a look up in all three arrays, cache array 300, directory array 302, and LRU array 304. A hit in directory array causes the corresponding entry in the L2 cache array to return cache data. The corresponding entry in LRU array 304 will return the LRU bits to p-LRU control 306 for update and replacement. If a miss in directory array 302 occurs, the data from the corresponding L2 cache array entry in cache array 300 is ignored. LRU data from the corresponding LRU array entry will be used for replacement when miss data returns.

All the bits in the corresponding LRU entry will be used to compute a replacement. P-LRU control 306 examines these bits to choose or select a least recently used set within cache array 300 for replacement in the event of a cache miss. The selection of the set in a cache is made using a selection process as described below with reference to FIG. 4. The new LRU bits are updated to point to the next least recently used set for either a cache hit or miss. P-LRU control 306 then sends the new LRU bits and their array write enable back to LRU array 304.

Figure 4:
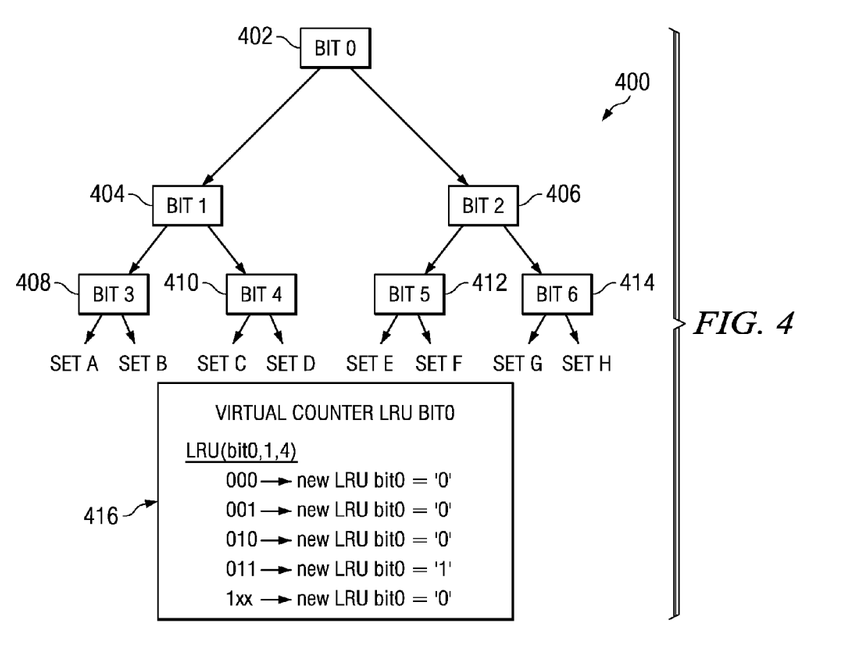
FIG. 4 is a diagram illustrating a binary tree in accordance with the illustrative embodiment.

Turning now to FIG. 4, a diagram illustrating a binary tree is depicted in accordance with the illustrative embodiment. Binary or root tree 400 contains leaves 402-414. Binary tree 400 is a pictorial representation of a binary tree that may be implemented in an LRU array, such as LRU array 304 in FIG. 3. This tree is used, in these examples, to determine which sets in a cache are to be replaced. Leaf 402 is a base leaf and corresponds to bit 0; leaf 404 corresponds to bit 1; leaf 406 corresponds to bit 2; leaf 408 corresponds with bit 3; leaf 410 corresponds to bit 4; leaf 412 corresponds to bit 5; and leaf 414 corresponds to bit 6.

The final leaves, leaves 408-414, point to sets A-H in these examples. Of course, different numbers of sets may be implemented depending on the particular embodiment. If bit 0 in leaf 402 is set equal to 0, the process goes to the left to leaf 404. If bit 0 in leaf 402 is set equal to 1, the process goes to the right side of the tree to leaf 406. Whenever a set represented in binary tree 400 is accessed, p-LRU control, such as p-LRU control 300 in FIG. 3, sets the corresponding LRU bit to point away from that set.

In these examples, binary tree 400 is implemented for use by as a binary tree algorithm in a p-LRU. When locking is present in a cache, an unbalanced replacement of sets may occur because one side of binary tree 400 may have more accesses when sets in binary tree 400 are locked for use by applications. Binary tree 400 has two sides. One side, the left side, includes leaves 404, 408, and 410, while the other side, the right side, includes leaves 406, 412, and 414 and is the opposite side to the left side. The heavy side is the side of binary tree that has had more sets that are locked.

Current pseudo-LRU systems divide a cache, such as cache array 300 in FIG. 3, into unbalanced combinations. For example, an 8-way associated cache may be divided into 5 ways and 3 ways or into 6 ways or 2 ways. For example, sets A, B, C, D, and E are locked for use by program X and sets F, G, and H are locked for use by program Y. Because program X can only replace set A, B, C, D, and E, only LRU bits (0,1,3,4) can be updated by the p-LRU for replacement. LRU bits (2,5,6) are ignored. As a result, set E is chosen for replacement for every other cache miss in this example. If a cache miss occurs, set D is selected. P-LRU control flips the bits leading to set D to the opposite value, resulting in bit 0 becoming a logic 1.

Only set E is chosen for replacement by the p-LRU when bit 0 is a logic 1 because of the locking that is present in this example. On the next miss, p-LRU control bit 0 sets back to a logic 0 and selects set B. The next miss causes bit 0 to change to a logic 1, resulting in set E being chosen again. As misses occur, the p-LRU control selects different sets on the side with bit 0 set equal to a logic 0, while the p-LRU control always selects set E when bit 0 is set equal to a logic 1.

For 10 consecutive cache misses to the same congruence class, each set should be chosen for replacement only twice in full LRU. In this example, the p-LRU chooses set E is five times. Therefore, only about forty percent of a full LRU's performance is achieved in a consecutive cache miss case. This worst case can apply to any case that has either 4 sets on the left or right side of the binary tree are reserved or locked and only one set is reserved or locked on the other side of the binary tree.

The illustrative embodiments reduce this unbalanced replacement of sets in a cache in which locking of sets is present using virtual counter 416. Virtual counter 416 is located in LRU array 304 in FIG. 3 in these examples. In these examples, virtual counter 416 is formed using bit 0, 1, and 4 for each entry in LRU array 304 in FIG. 3. This counter is a virtual counter that does not count the same way as a normal counter. For example, bit 0 of each entry of the LRU array will change to "1" unless bit 0, 1, 4="011". Virtual counter 416 is used to force bit 0 in leaf 402 not to update on every cache access to the same congruence class. In these examples, a congruence class is a cache array entry or row.

Furthermore, for data that has the same lower set of addresses will map to the same cache entry. In an 8-way set associative cache, there can be 8 different data stores in the same cache entry. In these examples, a cache access occurs if a cache hit or replacement for a set occurs.

In these illustrative examples, bit 0 in leaf 402 updates when virtual counter 416 indicates that more accesses have occurred to the heavy side than the light side. Specifically, in this example, virtual counter 416 changes bit 0 in leaf 402 to a logic 1 after 4 hits have occurred on the heavy side. In the depicted example, 4 sets are locked on one side of LRU bit 0 and one is locked in the other side. The rest of the bits, such LRU bit 1, 3 and 4 are switched the same way as normal LRU scheme. Only bit 0 is enforced by the virtual counter in these illustrative examples.

The illustrative embodiments improve the performance of this pseudo-LRU system without adding additional LRU bits. In these illustrative examples, existing bits are used as virtual counters as shown by virtual counter 416. The virtual counter used for binary tree 400 ensures that the logic in the p-LRU control chooses the bit size of the LRU bit 0 after the p-LRU control has chosen the heavy side of LRU bit 0 four times in these examples. In this example, when virtual counter 416 with LRU bit 0 in leaf 402, bit 1 in leaf 404, and bit 4 are set equal to "011", the p-LRU control switches LRU bit 0 in leaf 402 to a logic 1 to choose set E as the next recently used set for replacement. As a result, in these examples, after p-LRU control selects bit 0 in leaf 402 four times, the p-LRU control selects set E as the next recently used set replacement, rather than repeating selection of data in sets A-D.

Figure 5:
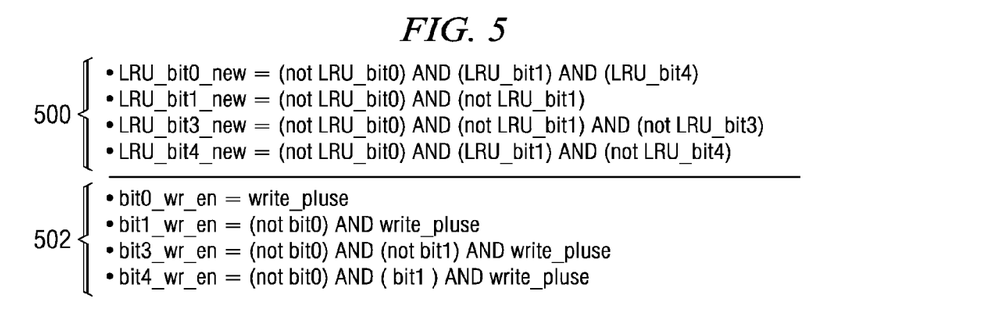
FIG. 5 is a diagram illustrating equations for a cache miss case in accordance with an illustrative embodiment.

Turning next to FIG. 5, a diagram illustrating equations for a cache miss in case is depicted in accordance with an illustrative embodiment. Equations 500 are examples of ones that may be implemented in a LRU control such as p-LRU control 306 in FIG. 3. Equations for computing new LRU bits are found in section 500, while write pulse equations are found in section 502. The equations in section 500 show equations used by a p-LRU control to compute new LRU bits 0, 1, 3, and 4 in a cache miss case. The equations for LRU bits 1, 3 and 4 are the same as that used by a normal p-LRU control.

Each time a cache miss or cache hit occurs, LRU data is used to calculate for replacement. This data is also needed to update for the next access to the same cache entry. These equations show how the updated LRU bits are generated by the p-LRU control. For LRU bit 0, the p-LRU control is only changed to 1 when the value of old LRU bit 0, 1, and 4="011". The write pulse equations are used whenever a need is present to update the LRU array because an access to the cache array occurs.

Write pulse equations in section 502 are used to save power, such that only those LRU bits that need to be updated will be written back to the LRU array. For those LRU bits that do not need to be updated, those LRU bits will not be written back to LRU array. The write pulse equations generate a power token for each updated LRU bit whenever an access to a L2 cache occurs. These tokens are used to determine what bits are to be written back to the LRU array by the p-LRU control. So, when no access to the L2 cache occurs, no need is present to update the LRU array.

Figure 6:
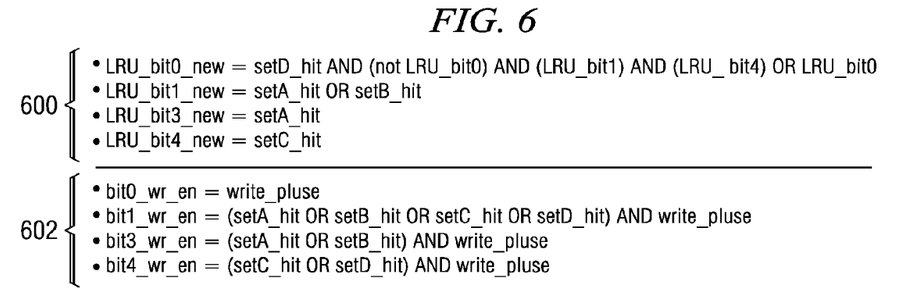
FIG. 6 is a diagram illustrating equations for a cache hit case in accordance with an illustrative embodiment.

Turning now to FIG. 6, a diagram illustrating equations for a cache hit case in accordance with an illustrative embodiment. Equations 600 are examples of equations for use in implementing LRU bits are illustrated. These equations may be implemented in a LRU control, such as p-LRU control 306 in FIG. 3. Equations for computing new LRU bits are found in section 600, while write pulse equations are found in section 602. Equations in section 600 in FIG. 6 show equations for the computation of new LRU bits 0, 1, 3, and 4 by a p-LRU control in a cache hit case.

For example, LRU_bit 0 contains the value of LRU_bit 0 that either is "0" or "1". The equations for LRU bits 1, 3, and 4 are the same as used by a normal p-LRU control. As a result, regardless what the LRU bits are and whenever there is a cache hit in set A, B, or C, the p-LRU control LRU bit 1, 3, and 4 will be updated. LRU bit 0 will be only updated when set D is hit and when LRU bit 0, 1, and 4 equal "011". Write pulse equations in section 602 are used whenever a need is present to update LRU array because an access to the cache array occurs. For example, LRU0_WR_EN is the power token for LRU_BIT0.

Figure 7:
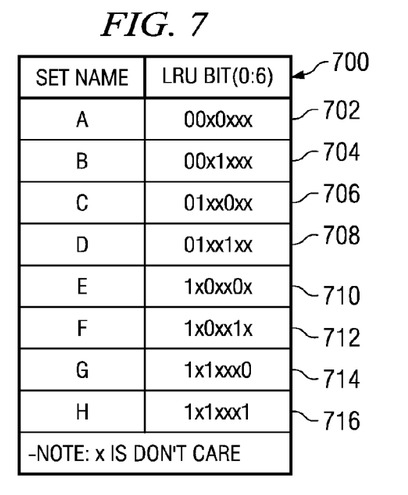
FIG. 7 is a diagram illustrating a definition of LRU bits is depicted in accordance with an illustrative embodiment.

Turning now to FIG. 7, a diagram illustrating a definition of LRU bits is depicted in accordance with an illustrative embodiment. In this example, table 700 illustrates LRU bits within an LRU array for different set names. These set names, in this example, correspond to sets A-H from binary tree 400 in FIG. 4. In this example, entries 702-716 correspond to sets A-H, respectively. The values of the LRU bits in these entries correspond to the values needed to reach a particular set in binary tree 400 in FIG. 4.

Figure 8:
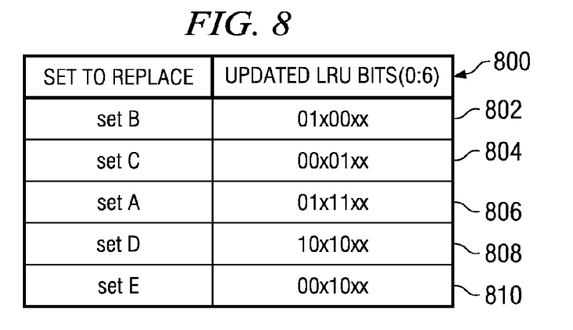
FIG. 8 is a diagram illustrating updates to LRU bits based on the equations described in FIGS. 5 and 6 in accordance with an illustrative embodiment.

Turning now to FIG. 8, a diagram illustrating updates to LRU bits based on the equations described in FIGS. 5 and 6 are depicted in accordance with an illustrative embodiment. In table 800, entries 802-810 contain updated LRU bits for sets B, C, A, D and E respectively. These bits are examples of bits found in LRU array 304 in FIG. 3. A p-LRU control makes these updates using a virtual counter with LRU bit 0, bit 1, and bit 4, in these examples. In this manner, increased performance is achieved with respect to a real LRU implementation, which would normally require additional space on a chip.

In a cache hit case, the p-LRU control sets LRU bit 0 to 1 only when a cache hit is present at set D and set D is the least recently used set. In this example, set D is on the heavy side of the binary tree with reference back to the example described in FIG. 4. From that example, sets A, B, C, D, and E are locked for use by program X, while sets F, G, and H are locked for use by program Y. The lighter side is the side of the binary tree that has fewer sets that are locked for a particular program. Once the p-LRU control sets LRU bit 0 equal to a logic 1, this bit stays set equal to 1 until the set on the lighter side is chosen for replacement.

Figure 9:
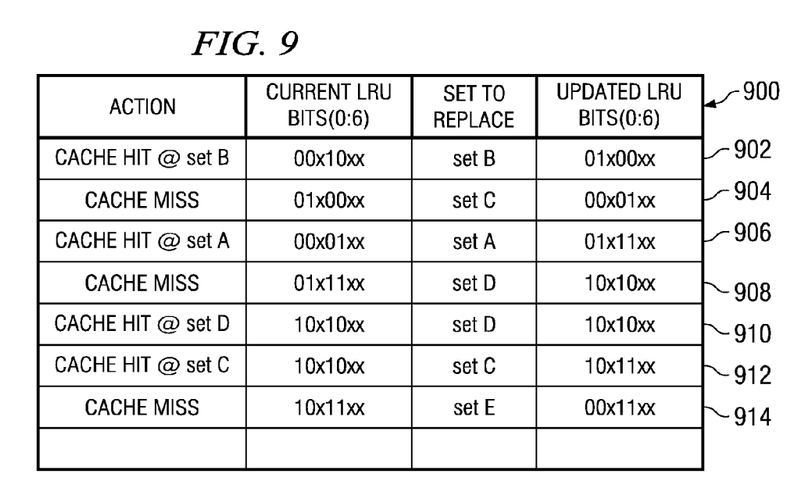
FIG. 9 is a table illustrating the use of a virtual counter to replace set in accordance with an illustrative embodiment.

Turning now to FIG. 9, a table illustrating the use of a virtual counter to replace set is depicted in accordance with an illustrative embodiment. In this example, table 900 shows the use of a virtual counter with LRU bit 0, bit 1, and bit 4. In this example, entries 902-914 are present. Each entry contains an action, a current LRU bit, a set to replace and update LRU bits. The p-LRU control updates the LRU bits using the virtual counter. As can be seen in the particular example, the p-LRU control chooses set E is for replacement twice instead of four times, as which would occur with the currently used processes. As a result, this virtual counter scheme provides a fifty percent improvement over a typical pseudo-LRU implementation.

Figure 10:
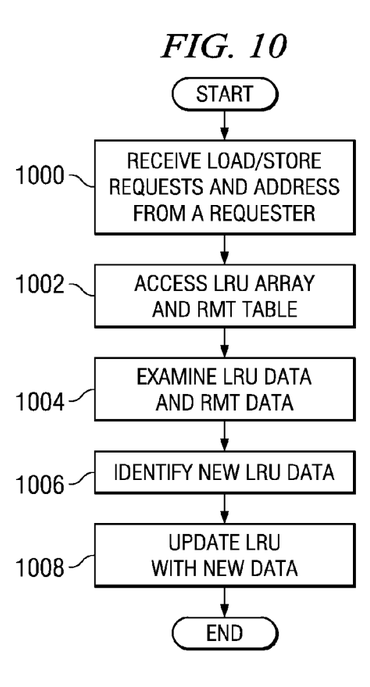
FIG. 10 is a flowchart of a process for managing an LRU array in accordance with an illustrative embodiment.

Turning now to FIG. 10, a flowchart of a process for managing an LRU array is depicted in accordance with an illustrative embodiment. The process illustrated in FIG. 10 may be implemented in a LRU unit, such as p-LRU control 306 in FIG. 3. In particular, this process illustrates the timing of how the LRU control interacts with an LRU array and a replacement management table.

The process begins by receiving a load/store request and address from a requester (step 1000). In these examples, the requester is, for example, either an execution unit or a L2 load and store queue control. The process the accesses the LRU array and the RMT tables (step 1002). This access occurs during the first processor cycle. The LRU data and RMT data are obtained and the process examines the LRU data and the RMT data to identify the least recently used sets in the cache array (step 1004). This step occurs during the second processor cycle.

Thereafter, the process uses the LRU data and the RMT data to identify the next least recently used set and LRU data associated with that set (step 1006). This particular step happens at cycle three in the processor in these examples. Next, the process updates the LRU array with the new data (step 1008) with the process terminating thereafter. The new data is the new LRU data that is generated by the equations shown in FIG. 5 and FIG. 6 on every cache access. The data generated in FIG. 5 is for a cache miss, while the data generated in FIG. 6 is for a cache hit.

Figure 11:
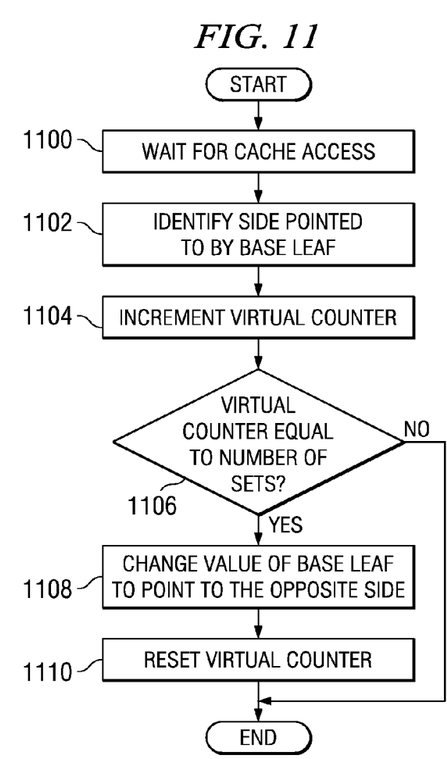
FIG. 11 is a flowchart of a process for selecting sides of a binary tree with a virtual counter in accordance with an illustrative embodiment.

With reference now to FIG. 11, a flowchart of a process for selecting side of a binary tree with a virtual counter is depicted in accordance with an illustrative embodiment. The process illustrated in FIG. 11 may be implemented in a component, such as p-LRU control 306 in FIG. 3.

The process is initiated in response to a cache access to a set when sets are locked in the cache. The access in these examples is a cache hit on a set or a replacement of a set. The process begins by waiting for a cache access to a set to occur (step 1100). In these examples, the caches access is for a program that is being executed. When a cache access occurs, the process identifies the side pointed to by the base leaf in a binary tree (step 1102). The base leaf is the leaf in the binary tree that contains bit 0. Thereafter, the process increments the virtual counter (step 1104). The virtual counter is, for example, virtual counter 406 in FIG. 4 and is maintained in a LRU array, such as LRU array 304 in FIG. 3. The process increments the counter each time an access to a set occurs. A determination is made as to whether the virtual counter is equal to the number of sets on the side that has been identified (step 1106).

If the virtual counter is equal to the number of sets, the process changes the value of the base leaf to point to the opposite side of the binary tree (step 1108). Thereafter, the process resets the virtual counter equal to zero (step 1110) and terminates. Turning back to the determination made in step 1106, if the virtual counter is not equal to the number of sets, the process terminates.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store or communicate the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for managing replacement of sets in a locked cache, the computer implemented method comprising:
    responsive to a cache access by a program to a set locked in a cache, identifying a side of a binary tree pointed to by a base leaf to form an identified side, wherein a cache access comprises a cache hit or a replacement of a set;
    determining whether a number of accesses to the identified side equals a number of sets associated with the program on the identified side, wherein a virtual counter tracks the number of accesses to the identified side;
    responsive to the number of accesses to the identified side being equal to the number of sets associated with the identified side, changing a value of the base leaf to point to an opposite side of the binary tree; and
    updating a least recently used array using the value of the base leaf.

2. A computer program product comprising a computer-readable medium tangibly embodying executable program code, which when executed by a processor, performs actions for managing sets in a locked cache, the actions comprising:
    identifying a side of a binary tree pointed to by a base leaf to form an identified side in response to a cache access by a program, wherein a cache access comprises a cache hit or a replacement of a set;
    determining whether a number of accesses to the identified side equals a number of sets associated with the program on the identified side, wherein a virtual counter tracks the number of accesses to the identified side; and
    responsive to the number of accesses to the identified side being equal to the number of sets associated with the identified side, changing a value of the base leaf to point to an opposite side of the binary tree; and updating a least recently used array using the value of the base leaf; and
    updating a least recently used array using a value of the base leaf.

3. A caching system comprising:
    a cache array, wherein sets of data are stored in the cache array and wherein the cache array is a locked cache;
    a directory array that stores an address, validity and cache coherence information;
    a least recently used array, wherein the least recently used array contains a binary tree; and
    a control unit, wherein the control unit identifies a side of the binary tree pointed to by a base leaf to form an identified side responsive to a cache access, by a program the cache access comprising a replacement of a set in the locked cache; determines whether a number of accesses to the identified side equals a number of sets associated with the program on the identified side, the number of accesses to the identified side being tracked by a virtual counter; and changes the base leaf to point to an opposite side of the binary tree if the number of accesses to the identified side equals the number of sets associated with the program on the identified side; and updates a least recently used array using a value of the base leaf.

* * * * *